United States Patent

Moriya et al.

(12) United States Patent
Moriya et al.

(10) Patent No.: US 6,739,191 B2
(45) Date of Patent: May 25, 2004

(54) ANGULAR VELOCITY SENSOR

(75) Inventors: Kazufumi Moriya, Yokohama (JP); Yoichi Mochida, Fujisawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/737,183

(22) Filed: Dec. 14, 2000

(65) Prior Publication Data

US 2001/0004847 A1 Jun. 28, 2001

(30) Foreign Application Priority Data

Dec. 28, 1999 (JP) ............................. 11-373682

(51) Int. Cl.[7] ................................................ G01P 9/04
(52) U.S. Cl. ..................................................... 73/504.14
(58) Field of Search ........................ 73/504.12, 504.14, 73/504.04, 504.02, 504.13, 504.15

(56) References Cited

U.S. PATENT DOCUMENTS

| | | | |
|---|---|---|---|
| 6,044,707 A | | 4/2000 | Kato |
| 6,089,089 A | * | 7/2000 | Hsu ........................ 73/50.12 |
| 6,122,961 A | * | 9/2000 | Geen et al. ............. 73/504.12 |
| 6,122,962 A | | 9/2000 | Yoshino et al. |
| 6,134,961 A | * | 10/2000 | Touge et al. ............. 73/504.12 |
| 6,240,780 B1 | * | 6/2001 | Negoro et al. ........... 73/504.12 |
| 2001/0037682 A1 | * | 11/2001 | Konaka et al. .......... 73/504.02 |

FOREIGN PATENT DOCUMENTS

| | | |
|---|---|---|
| DE | 19827688 | 1/1989 |
| DE | 4428405 | 12/1996 |
| DE | 19801981 | 12/1998 |
| EP | 0862048 | 9/1998 |
| JP | 5312576 | 11/1993 |
| JP | 10-170276 | 6/1998 |
| JP | 11-044541 | 2/1999 |
| JP | 11-337342 | 12/1999 |

* cited by examiner

*Primary Examiner*—Helen Kwok
(74) *Attorney, Agent, or Firm*—Keating & Bennett, LLP

(57) ABSTRACT

An angular velocity sensor includes a substrate; a first vibrator supported on the substrate by a first support beam, such as to be vibratable in a direction parallel to the substrate; a second vibrator supported by a second support beam parallel to the first vibrator, such as to be vibratable in a direction orthogonal to the vibrating direction of the first vibrator; a vibration generator for vibrating the first vibrator parallel to the substrate; an angular velocity detector for detecting the amount of displacement of the second vibrator due to an angular velocity; and a vibration-state monitor provided between the substrate and the first vibrator for monitoring the amount of displacement of the first vibrator when it is vibrated by the vibration detector.

8 Claims, 2 Drawing Sheets

ANGULAR VELOCITY SENSOR

BACKGROUND OF THE INVENTION

1. Field of the Invention

The present invention relates to an angular velocity sensor suitable for detecting the angular velocity of a rotating body and the like.

2. Description of the Related Art

A first known angular velocity sensor (such as disclosed in Japanese Unexamined Patent Application Publication No. 5-312576) includes a substrate, a first vibrator supported on the substrate by a first support beam and vibratable in parallel to the substrate, a second vibrator supported by a second support beam parallel to the first vibrator and vibratable in a direction orthogonal to the vibrating direction of said first vibrator, vibration generating means for vibrating the first vibrator parallel to said substrate, and angular velocity detecting means for detecting the amount of displacement of said second vibrator as an angular velocity.

This conventional angular velocity sensor has three orthogonal axes, an X-axis, a Y-axis and a Z-axis. When an angular velocity around the X-axis direction is applied to the sensor, while a constant vibration is applied to, for example, the X-axis, the second vibrator is displaced in the Y-axis direction by a Coriolis force. Then, the angular velocity detecting means detects the displacement in the Y-axis direction of the second vibrator by the Coriolis force as variations of piezoelectric resistance, electrostatic capacitance and the like, and thereby the angular velocity is detected.

Further, a second conventional angular velocity sensor is known which includes a sensor, a movable part provided on a substrate by a support beam so as to be displaceable in the X-axis direction and in the Y-axis direction, vibration generating means for vibrating the movable part in the X-axis direction, angular velocity detecting means for, when an angular velocity around the Z-axis is applied while the movable part is vibrated in the X-axis direction, detecting the displacement of the movable part by a Coriolis force in the Y-axis direction, and displacement detecting means for detecting the amount of displacement when the movable part is displaced in the X-direction by the vibration generating means. An example of such a conventional angular velocity sensor is disclosed in European patent Publication No. EP0862048A2.

In the second conventional angular velocity sensor, the displacement detecting means includes electrodes provided between the movable part and the substrate, and the amount of displacement when the movable part is displaced in the X-axis direction is detected as a variation of electrostatic capacitance between these electrodes. Therefore, since the second conventional angular velocity sensor detects the displacement of the movable part in the Y-axis direction using the angular velocity detecting means, and detects the vibration of the movable part in the X-axis direction using the displacement detecting means, it is possible to detect a driving state when the movable part vibrates in the X-axis direction and then it is possible to control the vibration generating means to maintain a constant amplitude and to vibrate the movable part in the X-direction in a resonant state. As a result, since it is possible to vibrate the movable part in a resonant state, it is possible to detect a stable output (amount of displacement) of the movable part in the Y-axis direction.

In the first conventional angular velocity sensor disclosed in Japanese Unexamined Patent Application Publication No. 5-312576, it is possible to detect a stable output in the Y-axis direction when the frequency of vibration is always in a resonant state and the amplitude is constant while the first vibrator vibrates in the X-axis direction. However, in practice, when the first vibrator vibrates, the frequency and the amplitude vary due to deterioration over time, manufacturing errors and the like. In this case, there is a problem in that the output of the second vibrator becomes unstable and the detection sensitivity of the angular velocity deteriorates substantially.

The second conventional angular velocity sensor disclosed in European Patent Publication No. EP 0862048A2 detects the amplitude of the movable part in the X-axis direction by the displacement detecting means and controls the vibration generating means so that the amplitude becomes constant.

However, in the second conventional angular velocity sensor, the displacement detecting means is the electrode provided between the movable part and the substrate. However, the movable part is displaceable in two axial directions; therefore, a situation arises in which the electrodes of the displacement detecting means positioned approximately in parallel are inclined in accordance with the displacement of the movable part. Therefore, since the electrostatic capacitance between the electrodes provided between the movable part and the substrate varies by this inclination of the electrodes, there is a problem in that the displacement of the movable part in the X-axis direction can not be detected accurately.

SUMMARY OF THE INVENTION

Accordingly, the object of the present invention is to provide an angular velocity sensor which is capable of accurately detecting a vibration state by the vibration generating means and capable of always vibrating the first vibrator at a constant amplitude.

To achieve the foregoing and other objects, the present invention provides an angular velocity sensor including a substrate, a first vibrator supported by a first support beam on said substrate and arranged such as to be vibratable parallel to the substrate, a second vibrator supported by a second support beam parallel to said first vibrator and arranged such as to be vibratable in a direction orthogonal to the vibrating direction of said first vibrator, vibration generating means for vibrating the first vibrator parallel to said substrate, and angular velocity detecting means for detecting the amount of displacement of the second vibrator as an angular velocity.

In accordance with a first aspect of the invention, monitor means is provided between the substrate and the first vibrator for monitoring the amount of displacement of said first vibrator when it is vibrated by the vibration generating means.

With this configuration, when a driving signal is input into the vibration generating means from the outside, the first vibrator and the second vibrator vibrate parallel to the substrate, and when an angular velocity is applied around an axis orthogonal to the substrate in this state, the second vibrator is displaced parallel to the substrate and in a direction orthogonal to the vibration direction due to a Coriolis force.

In this case, the angular velocity detecting means detects a displacement in a direction orthogonal to the vibration direction generated in the second vibrator due to the Coriolis force when an angular velocity is applied around an axis orthogonal to the substrate while the first vibrator and the second vibrator vibrate parallel to the substrate. Also, the vibration-state monitor means detects the displacement of the first vibrator vibrating parallel to the substrate due to the vibration generating means.

With this configuration, the vibration of the second vibrator can be detected by the angular velocity detecting means and the vibration of the first vibrator can be detected independently of the angular velocity by the vibration state monitor, therefore, it is possible to always maintain a constant amplitude of the first vibrator.

According to a second aspect of the invention, the angular velocity detecting means comprises a detection fixed side electrode provided on the substrate and a detection movable side electrode provided for the second vibrator opposite to the detection fixed side electrode, and the vibration-state monitor means comprises a monitor fixed side electrode provided on the substrate and a monitor movable side electrode provided for the first vibrator opposite to the monitor fixed side electrode.

With this configuration, the angular velocity detecting means can detect the displacement in the orthogonal direction of the second vibrator as an electrostatic capacitance between the detection fixed side electrode and the detection movable side electrode. Also, the vibration-state monitor means can detect the displacement of the first vibration in the parallel direction as the electrostatic capacitance between the monitor fixed side electrode and the monitor movable side electrode.

According to a third aspect of the invention, the monitor fixed side electrode of the vibration-state monitor means is integrated with the detection fixed side electrode of the angular velocity detecting means.

With this configuration, a detection signal detected by the angular velocity detecting means and a monitor signal monitored by the vibration-state monitor means can be output from either the detection fixed side electrode or the monitor fixed side electrode. Then, the monitor fixed side electrode of the vibration state monitor means is integrated with the detection fixed side electrode; therefore, it is possible to make the angular velocity sensor smaller than a case in which these are separated.

According to a fourth aspect of the invention, the first support beam is positioned between said substrate and the first vibrator and is provided to support said first vibrator so as to be displaceable in one axial direction (in the X-axis direction) and the second support beam is positioned between the first vibrator and the second vibrator and provided to support the second vibrator so as to be displaceable in a direction orthogonal (in the Y-axis direction) to said one axial direction.

With this configuration, the first support beam supports the first vibrator to be displaceable in the X-axis direction while restricting the first vibrator from being displaced in the Y-axis direction. Also, since the second support beam supports the second vibrator to be displaceable in the Y-axis direction with respect to the first vibrator, the second vibrator is displaced in the X-axis direction together with the first vibrator and is also displaced in the Y-axis direction. Therefore, when an angular velocity around the Z-axis orthogonal to the X-axis and the Y-axis is applied in a state in which the first vibrator and the second vibrator vibrate in the X-axis direction, the second vibrator is displaced in the Y-axis direction due to a Coriolis force; however, the first vibrator is restricted to be displaced in the Y-axis direction. As a result, the vibration-state monitor means provided between the first vibrator and the substrate can detect only the displacement of the first vibrator in the X-axis direction and, therefore, the vibration state of the first vibrator can be detected accurately without being affected by angular velocity or the like.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF PREFERRED EMBODIMENTS

Hereinafter, the preferred embodiments of the present invention are explained in detail with reference to the drawings.

Figure 1:
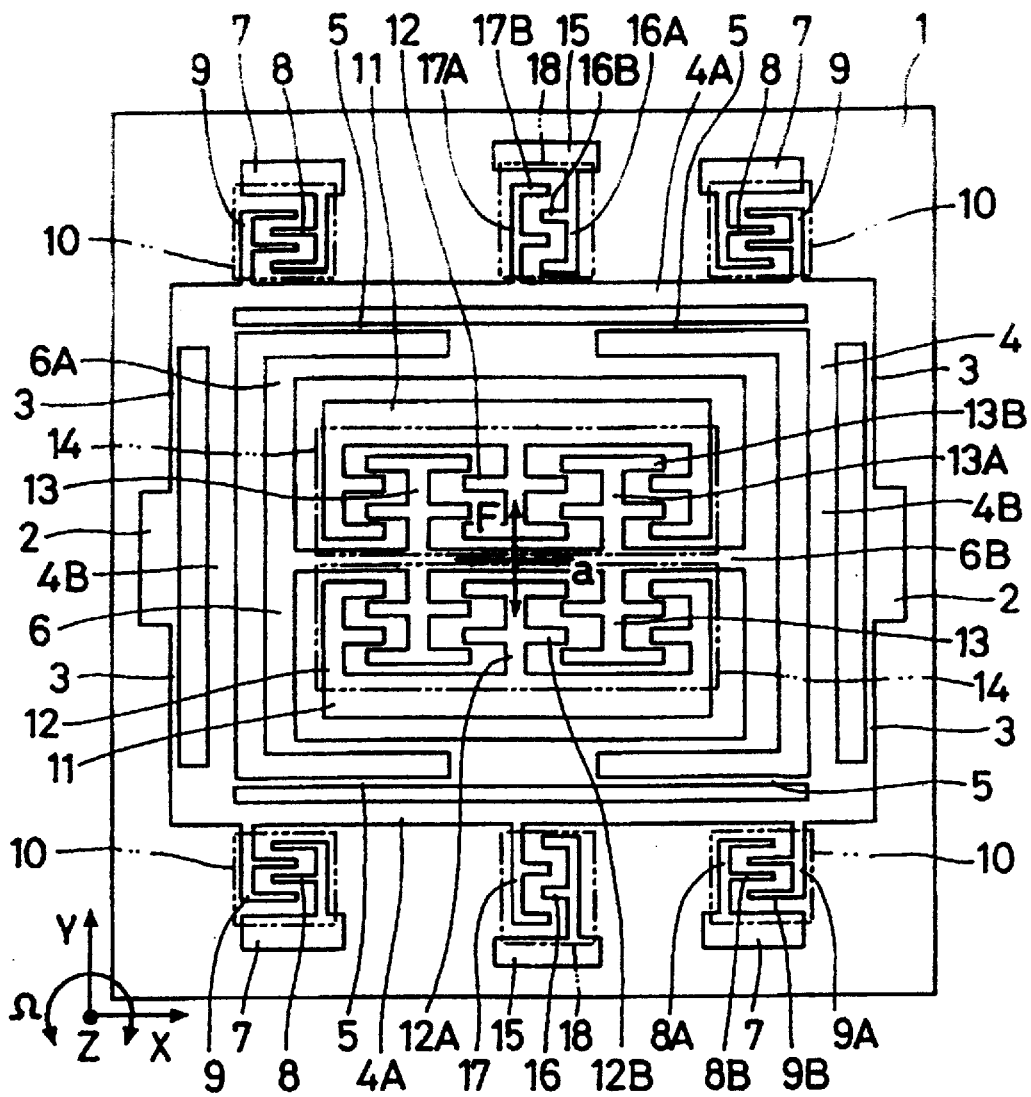
FIG. 1 is a plan view showing an angular velocity sensor according to a first embodiment.

FIG. 1 shows a first embodiment of the present invention in which reference numeral 1 denotes a rectangular substrate which is made from a silicon material having a high resistance.

Reference numerals 2 denote a pair of support parts fixed on the substrate 1 which support a first vibrator 4 in the X-axis direction from the left side and the right side thereof.

Reference numerals 3 denote first support beams extending in the Y-axis direction from both sides of each of the support parts 2. Since two first support beams 3 are provided for each of the support parts 2, four first support beams 3 are provided in total.

Reference numeral 4 denote a first vibrator supported by the first support beams 3 in spaced relationship to the surface of the substrate 1. The first vibrator 4 includes a rectangular frame including X-axis-direction frame parts 4A, 4A, which are opposite each other and extend in the X-axis direction and Y-axis-direction frame parts 4B, 4B, which are opposite each other and extend in the Y-axis direction. The ends of the support beams 3 opposite to the ends connected to the support parts 2, are attached to respective four corners of the first vibrator 4. With this arrangement, the first vibrator 4 becomes displaceable in the X-axis direction while the displacement in the Y-axis direction is restricted.

Reference numerals 5 denote a total of four second support beams positioned in the frame of the first vibrator 4 and extending in the X-axis direction in parallel to the X-axis-direction frame parts 4A, 4A and each of the support beams 5 extends from near each of the four corners of the first vibrator 4 to the middle part in the X-axis direction of the vibrator 4.

Reference numeral 6 denotes a second vibrator positioned in the frame of the first vibrator 4 and supported by the second support beams 5 in spaced relationship from the surface of the substrate 1. The second vibrator 6 is provided with a frame part 6A formed approximately in a rectangle and a connecting part 6B for connecting the right side and the left side of the frame part 6A. Two of the second beams 5 are attached to each of the front side and the rear side of the frame part 6A in the middle part of the sides. Also, the connecting part 6B is positioned in the middle part in the Y-axis direction and is provided with detection movable side electrodes 13, to be described in more detail below.

Reference numerals 7 denote a total of four vibration fixed-parts separately provided in the front direction and the rear direction (Y-axis direction) on the substrate 1. The vibration fixed-parts 7 flank the X-axis-direction frame parts 4A, 4A of the first vibrator 4 at the outside from the front and rear and are fixed on the substrate 1.

Reference numerals 8 are fixed side-vibration electrodes projecting from the vibration fixed-parts 7 towards the first vibrator 4, and each of the fixed side-vibration electrodes 8 is provided with a column 8A extending in the Y-axis direction from the vibration fixed-part 7 and a plurality of parallel electrode plates 8B extending in the X-axis direction from the column 8A.

Reference numerals 9 denote a total of four movable side vibration electrodes extending from the X-axis-direction frame parts 4A of the first vibrator 4 so as to be opposite to and interdigitated with the fixed side-vibration. Each of the movable side-vibration electrodes 9 are provided with a column 9A extending to the vibration fixed-part 7 in the Y-axis direction and a plurality of parallel electrode plates 9B and extending in the X-axis direction from the column 9A.

Reference numerals 10 denote vibration generating parts provided between the substrate 1 and the first vibrator 4. Each of the vibration generating parts 10 is constituted by the fixed side-vibration electrode 8 and the movable side-vibration electrode 9. Spaces are provided between the respective electrodes plates 8B of the fixed side-vibration electrode 8 at equal intervals and between the respective electrode plates 9B of the movable side-vibration electrode 9 at equal intervals. In operation, when driving signals of frequency f which are opposite in phase are applied from an oscillating circuit (not shown) to the fixed side-vibration electrodes 8 and the movable side-vibration electrodes 9, respectively, so as to generate an electrostatic attracting force alternately between each electrode plate 8B and each electrode plate 9B, the first vibrator 4 vibrates in the direction indicated by the arrow a (in the X-axis direction).

Reference numerals 11 denote detection fixed-parts positioned in the frame 6A of the second vibrator 6 which are fixed to the substrate 1. Each of the detection fixed-parts 11 is formed approximately in a rectangle extending in the X-axis direction and is arranged at a position separated from the connecting part 6B in the Y-axis direction.

Reference numerals 12 denote detection fixed side electrodes provided for each of the detection fixed-parts 11. Each of the detection fixed side electrodes 12 is provided with a column 12A extending in the Y-axis direction and a plurality of electrode plates 12B extending from the column 12B.

The detection fixed side electrodes 12 surround detection movable side electrodes 13 which are interdigitated with the detection fixed side electrodes 12. The detection movable side electrodes 13 are positioned at the front and rear of the connecting part 6B of the second vibrator 6 so as to oppose the detection fixed side electrodes 12 and are provided with a column 13A extending in the Y-axis direction and a plurality of electrode plates 13B extending from the column 13A.

Reference numerals 14 denote angular velocity detecting parts provided between the substrate 1 and the second vibrator 6. Each of the angular velocity detecting parts 14 is a parallel plate capacitor constituted by a plurality of the detection fixed side electrodes 12 and a plurality of the detection movable side electrodes 13. In operation, when an angular velocity Ω around the Z-axis is applied in a state in which the first vibrator 4 and the second vibrator 6 vibrate in the direction indicated by the arrow a, the second vibrator 6 is displaced in the Y-axis direction by a Coriolis force, and therefore, the angular velocity detecting parts 14 detect the amount of displacement corresponding to the angular velocity Ω of the second vibrator 6 in the Y-axis direction by a variation of the electrostatic capacitance between the detection fixed side electrodes 12 and the detection movable side electrodes 13 and outputs a detection signal corresponding to the electrostatic capacitance between the electrodes 12 and the electrodes 13.

Reference numerals 15 denote a total of two monitor fixed-parts separately provided on the substrate 1 in the Y-direction at the front and the rear, respectively. The monitor fixing parts 15 are positioned outside of the frame of the first vibrator 4 so as to flank the first vibrator 4 from the front and rear and are fixed on the substrate 1.

Reference numerals 16 denote monitor fixed side electrodes projecting from the monitor fixed-parts 15 towards the first vibrator 4. Each of the monitor fixed side electrodes 16 is provided with a column 16A extending in the Y-axis direction from the monitor fixed-part 15 and a plurality of electrode plates 16B extending from the column 16A in the X-axis direction.

Reference numerals 17 denote a total of two monitor movable side electrodes interdigitated with the monitor fixed side electrode 16. The monitor movable side electrodes 17 are positioned outside the frame of the first vibrator 4 and extend from the X-axis-direction frame part 4A of the first vibrator 4 so as to oppose the monitor fixed side electrodes 16. The monitor movable side electrodes 17 are provided with a column 17A extending in the Y-axis direction towards the monitor fixed-part 15 and a plurality of electrode plates 17B extending in the X-axis direction from the column 17A.

Reference numerals 18 denote vibration-state monitor parts provided between the substrate 1 and the first vibrator 4. Each of the vibration state monitor parts 18 is constituted by a monitor fixed side electrode 16 and a monitor movable side electrode 17 and spaces are provided between the respective electrode plates 16B of the monitor fixed side electrode 16 at equal intervals and between the respective electrode plates 17B of the monitor movable side electrode 17 at equal intervals.

The vibration-state monitor parts 18 thereby function as parallel plate capacitors. With this arrangement, the vibration-state monitor part 18 monitors the vibration state in which the first vibrator 4 is vibrated in the X-axis direction by the vibration generating part 10 as a variation of the electrostatic capacitance between the monitor fixed side electrode 16 and the monitor movable side electrode 17 and outputs a monitor signal corresponding to the electrostatic capacitance between the electrode 16 and the electrode 17 independently of the detection signal detected by the angular velocity detecting part 14.

A more detailed explanation of the angular velocity sensor according to the first embodiment will now be given.

First, when driving signals of frequency f having opposite phases are applied to each of the vibration generating parts 10, an electrostatic attracting force alternately occurs between each of the electrode plates 8B and each of the electrode plates 9B, and the first vibrator 4 vibrates by repeatedly moving back and forth in the direction of the arrow a (i.e., the X-axis direction) together with the second vibrator 6.

In the state in which the first vibrator 4 and the second vibrator 6 vibrate and an angular velocity Ω around the Z-axis is applied to the angular sensor, a Coriolis force F, in accordance with the following expression, is generated in the Y-axis direction and the second vibrator 6 is displaced in the Y-axis direction by the Coriolis force F.

[Expression 1]

$$F = 2m\Omega v$$

Where, m: mass of second vibrator

Ω: angular velocity v: speed of second vibrator in X-axis direction

Then, the second vibrator 6 vibrates in the Y-axis direction by the Coriolis force of expression 1, and each of the angular velocity detecting parts 14 detects the displacement of the second vibrator 6 as a variation of electrostatic capacitance between the detection fixed side electrode 12 and the detection movable side electrode 13 and detects the angular velocity Ω around the Z-axis.

When the first vibrator 4 and the second vibrator 6 vibrate in the X-axis direction by the vibration generating part 10, an electrostatic capacitance between the monitor fixed side electrode 16 and the monitor movable side electrode 17 of the vibration-state monitor part 18 varies. Therefore, it is possible for the vibration-state monitor part 18 to monitor vibration states of the first vibrator 4 and the second vibrator 6 by detecting the electrostatic capacitance between the monitoring fixed side electrode 16 and the monitor movable side electrode 17.

As a result, it is possible for the angular velocity detecting part 14 to measure the phase and the amount of displacement as a detection signal when the second vibrator 6 vibrates in the Y-axis direction by the Coriolis force resulting from the angular velocity Ω and it is possible for the vibration-state monitor part 18 to detect amplitudes independently of the detection signal (i.e., without being affected by the angular velocity Ω when the first vibrator 4 and the second vibrator 6 vibrate in the X-axis direction.

As described above, according to this embodiment, since the vibration-state monitor part 18 for monitoring the amount of displacement of the first vibrator 4 is provided between the substrate 1 and the first vibrator 4, it is possible for the angular velocity detecting part 14 to detect the displacement of the second vibrator 6 vibrating in the Y-axis direction by the Coriolis force F and it is possible for the vibration-state monitor part 18 to detect the displacement of the first vibrator 4 when it is vibrating in the X-axis direction. Therefore, it is possible for the angular velocity detecting part 14 to detect the vibration of the second vibrator 6 as the detection signal and it is possible for the vibration state monitor part 18 to detect the vibration of the first vibrator 4 as the monitor signal independently of the detection signal without being affected by the angular velocity Ω.

As a result, since it is possible to vibrate the first vibrator 4 at a constant amplitude at all times by controlling the vibration generating part 10 using the monitor signal from the vibration-state monitor part 18, it is possible to make the amount of displacement of the second vibrator 6 due to the angular velocity Ω stable. Therefore, since it is possible to detect the displacement of the second vibrator 6 accurately when the angular velocity Ω is applied, it is possible to obtain a stable output.

Also, since the angular velocity detecting part 14 is provided with the detection fixed side electrode 12 arranged on the substrate 1 and the detection movable side electrode 13 arranged on the second vibrator 6 and the vibration-state monitor part 18 is provided with the monitor fixed side electrode 16 arranged on the substrate 1 and the monitor movable side electrode 17 arranged on the first vibrator 4, the angular velocity detecting part 14 can detect the displacement of the second vibrator 6 in the Y-axis direction as the electrostatic capacitance between the detection fixed side electrode 12 and the detection movable side electrode 13 and the vibration-state monitor part 18 can detect the displacement of the first vibrator 4 in the X-axis direction as the electrostatic capacitance between the monitor fixed side electrode 16 and the monitor movable side electrode 17.

Further, the first support beam 3 is positioned between the substrate 1 and the first vibrator 4 so as to support the first vibrator 4 to be displaceable in the X-axis direction and to restrict the displacement of the first vibrator 4 in the Y-axis direction. Also, the second support beam 5 supports the second vibrator 6 so that it can be displaced in the X-axis direction together with the first vibrator and also can be displaced in the Y-axis direction.

As a result, in a state in which the first vibrator 4 and the second vibrator 6 vibrate in the X-axis direction and when the angular velocity Ω acts around the Z-axis direction, the second vibrator 6 is displaced in the Y-axis direction by the Coriolis force, but, the displacement of the first vibrator 4 in the Y-axis direction is substantially restricted.

As a result, the electrode plate 17B of the monitor movable side electrode 17 is displaced in the X-axis direction while maintaining an approximately parallel state without inclining with respect to the electrode plate 16B of the monitor fixed side electrode 16, and the vibration-state monitor part 18 arranged between the first vibrator 4 and the substrate 1 detects only the displacement of the first vibrator 4 in the X-axis direction and detects the vibration state of the first vibrator 4 independently of the second vibrator 6 without being affected by the angular velocity Ω.

Figure 2:
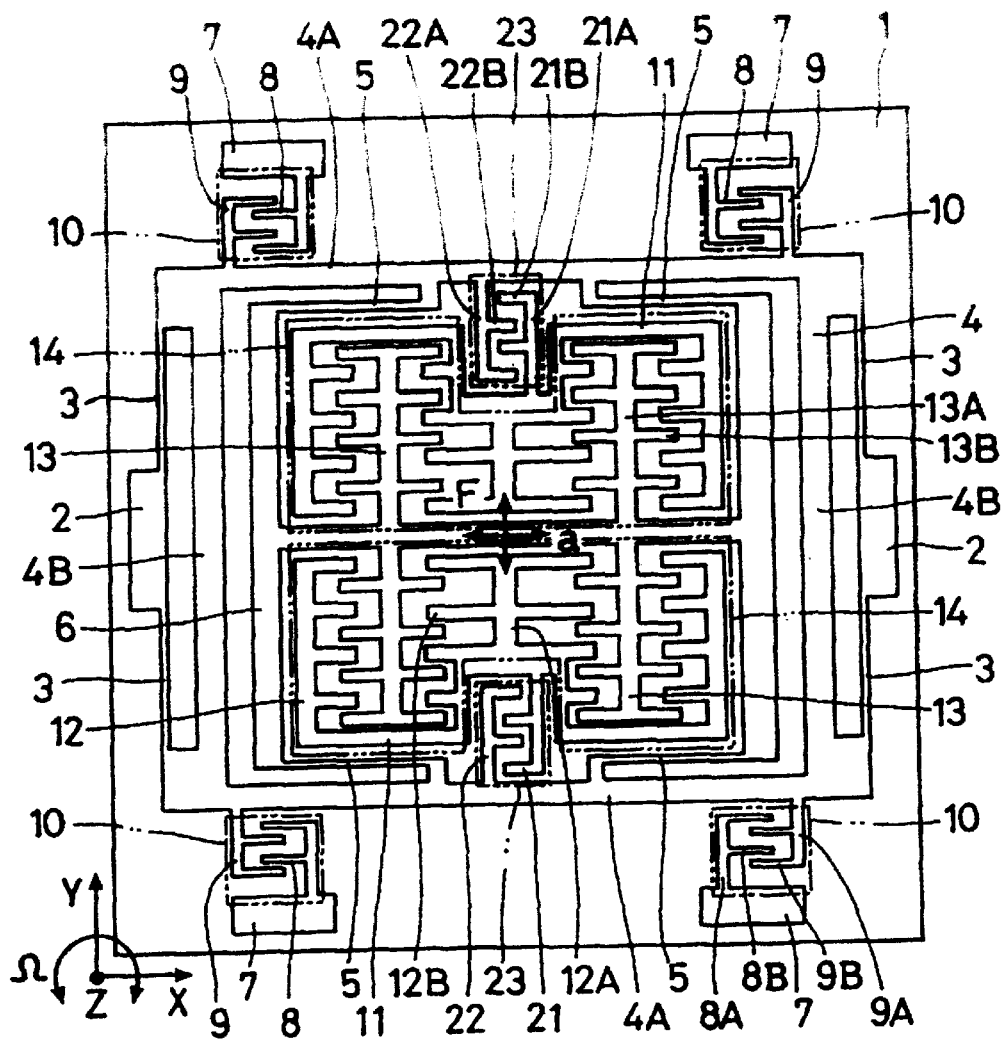
FIG. 2 is a plan view showing an angular velocity sensor according to a second embodiment.

Next, FIG. 2 shows an angular velocity sensor according to the second embodiment of the present invention, and a feature of the second embodiment is a configuration in which the monitor fixed side electrode in the vibration-state monitor part and the detection fixed side electrode of the angular velocity detecting part are integrated. Elements in the second embodiment which correspond to those in the first embodiment have the same reference numerals and explanations thereof will be omitted.

Reference numerals 21 denote monitor fixed side electrodes extending from the detection fixed-part 11 to the first vibrator 4. Each of the monitor fixed side electrodes 21 is provided with a column 21A extending in the Y-axis direction from the detection fixed-part 11 and a plurality of electrode plates 21B arranged in parallel and extending from column 21A.

Reference numerals 22 denote two monitor movable side electrodes interdigitated with the monitor fixed side electrodes 21. Each monitor movable side electrode 22 is positioned in the frame of the first vibrator 4 and is arranged in the X-axis-direction frame part 4A of the first vibrator 4 so as to oppose the monitor fixed side electrode 21. Also, the monitor movable side electrode 22 is provided with a column 22A extending in the Y-axis direction towards the detection fixed-part 11 and a plurality of electrode plates 22B provided in parallel extending in the X-axis direction from the column 22A.

Reference numerals 23 denote vibration-state monitor parts between the substrate 1 and the first vibrator 4. Each vibration-state monitor part 23 is constituted by the monitor fixed side electrode 21 and the monitor movable side electrode 22. Spaces are formed between each electrode plate 21B of the monitor fixed side electrode 21 and each electrode plate of the monitor movable side electrode 22 at equal intervals.

The vibration-state monitor part 23 functions as a parallel plate capacitor. With this configuration, the vibration state monitor part 23 monitors the vibration state in which the first vibrator 4 is vibrated by the vibration generating part 10 in the X-axis direction as a variation of the electrostatic capacitance between the monitor fixed side electrode 21 and the monitor movable side electrode 22 and outputs a monitor signal corresponding to the electrostatic capacitance between each electrode 21 and each electrode 22 via the detection fixed-part 11.

As described above, according to the second embodiment, it is possible to obtain effects similar to the first embodiment. Further, according to the second embodiment, since the monitor fixed side electrode 21 of the vibration-state monitor part 23 are integrated with the detection fixed side electrode 12 of the angular velocity detecting part 14, it is possible to output the detection signal detected by the angular velocity detecting part 14 and the monitor signal monitored by the vibration-state monitor part 23 using the detection fixed-part 11 and thereby it is possible to reduce the number of electrodes for outputting signals.

Also since the monitor fixed side electrode 21 of the vibration state monitor part 23 is integrated with the detection fixed side electrode 12, it is possible to make the angular velocity sensor smaller than the case in which these are separated.

In addition, though the detection fixed-part 11 outputs the detection signal by the angular velocity detecting part 14 and the monitor signal by the vibration state monitor part 23 together, the monitor signal is detected independently of the detection signal without being affected by the angular velocity $\Omega$. Therefore, it is possible to surely separate the detection signal and the monitor signal by connecting an oscillating circuit, a subtracting circuit, an adding circuit, a multiplying circuit, a frequency controlling circuit and the like similarly to the angular velocity sensor disclosed in European Patent Publication No. EP0862048A2 and U.S. Pat. No. 6,122,962 corresponding thereto. The entire disclosure of the U.S. patent is hereby incorporated by reference.

Further, according to each of above-mentioned embodiments, the first vibrator 4 is provided on the substrate 1 to be displaceable in the X-axis direction parallel to the substrate 1 and the second vibrator 6 is provided in the first vibrator 4 to be displaceable in the Y-axis direction orthogonal to the X-axis direction parallel to the substrate 1; however, the present invention is not limited to this, and the first vibrator 4 may be provided in the substrate 1 to be displaceable in the X-axis direction parallel to the substrate 1 and the second vibrator 6 may be provided in the first vibrator 4 to be displaceable in the Z-axis direction vertical to the X-axis direction parallel to the substrate 1.

As described above, according to the invention, since vibration-state monitor means for monitoring the amount of displacement of a first vibrator is provided between a substrate and the first vibrator, it is possible to detect the displacement of a second vibrator vibrating in an orthogonal direction due to a Coriolis force by the angular velocity detecting means and it is possible for the vibration-state monitor means to detect the displacement of the first vibrator vibrating parallel to the substrate due to vibration generating means. With this configuration, it is possible for the angular velocity detecting means to detect the vibration of the second vibrator and it is possible for the vibration-state monitor means to detect the vibration of the first vibrator independently of the detection signal without being affected by the angular velocity. As a result, regardless of effects of the angular velocity, it is possible to drive the first vibrator at all times and to detect the angular velocity accurately by making the amount of displacement of the second vibrator stable when the angular velocity is applied.

Also, according to the invention, since the angular velocity detecting means is provided with the detection fixed side electrode arranged on the substrate and the detection movable side electrode arranged in the second vibrator, and the vibration-state monitor means is provided with the monitor fixed side electrode arranged on the substrate and the monitor movable side electrode arranged in the first vibrator, the angular velocity detecting means detects the displacement of the second vibrator in the orthogonal direction as an electrostatic capacitance between the detection fixed side electrode and the detection movable side electrode and the vibration-state monitor means detects the displacement of the first vibrator in the parallel direction as an electrostatic capacitance between the monitor fixed side electrode and the monitor movable side electrode. With this configuration, the angular velocity detecting means outputs the detection signal corresponding to the electrostatic capacitance between the detection fixed side electrode and the detection movable side electrode and the vibration-state monitor means outputs the monitor signal corresponding to the electrostatic capacitance between the monitor fixed side electrode and the monitor movable side electrode independently of the detection signal without being affected by the angular velocity and, therefore, it is possible to vibrate the first vibrator and the second vibrator parallel to the substrate at constant amplitudes at all times.

Also, according to the invention, since the monitor fixed side electrode of the vibration-state monitor means and the detection fixed side electrode of the angular velocity detecting means are integrated, it is possible to output the detection signal detected by the angular velocity detecting means and the monitor signal monitored by the vibration-state monitor means from either the detection fixed side electrode or the monitor fixed side electrode and thereby it is possible to reduce the number of electrodes for outputting signals. Further, since the monitor fixed side electrode of the vibration-state monitor means and the detection fixed side electrode are integrated, it is possible to make the angular velocity sensor smaller than an angular velocity sensor in which these are separated.

Furthermore, according to the invention, the first support beam is positioned between the substrate and the first vibrator and supports the first vibrator to be displaceable in a direction (X-axis direction) and the second support beam is positioned between the first vibrator and the second vibrator and supports the second vibrator to be displaceable in an orthogonal direction to the direction (Y-axis direction), and therefore, while the first beam supports the first vibrator to be displaceable in the X-axis direction, it is possible to restrict the displacement of the vibrator in the Y-axis direction. Also, the second support beam supports the second vibrator to be displaceable in the Y-direction with respect to the first vibrator, therefore, the second vibrator is displaced in the X-axis direction together with the first vibrator while also being displaced in the Y-axis direction.

Therefore, in a state in which the first vibrator and the second vibrator vibrate while an angular velocity is applied around the Z-axis direction, the second vibrator is displaced in the Y-axis direction, but the first vibrator is substantially restricted from displacement in the Y-axis direction. As a result, the vibration-state monitor means provided between the first vibrator and the substrate can detect only the displacement in the X-axis direction and can detect the vibration state of the first vibrator independently of the detection signal without being affected by the angular velocity.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An angular velocity sensor comprising:

a substrate;

a first vibrator supported on said substrate by a first support beam to be vibratable in a plane and in a first direction parallel to said substrate;

a second vibrator supported by a second support beam to be vibratable in a second direction orthogonal to a vibrating direction of said first vibrator and in the same plane thereof, said second vibrator being displaceable in said second direction orthogonal to the vibrating direction of said first vibrator when an angular velocity is applied thereto, said first vibrator being supported so as not to be substantially displaceable in said second direction;

a vibration generator supported on said substrate for vibrating said first vibrator parallel to said substrate;

an angular velocity detector supported on said substrate for detecting an amount of displacement of said second vibrator in said second direction when an angular velocity is applied thereto;

a vibration-state monitor provided between said substrate and said first vibrator for monitoring an amount of displacement of said first vibrator in said first direction, when said first vibrator is vibrated by said vibration generator, wherein said angular velocity detector, and said vibration-state monitor, each include respective fixed side and movable side electrodes, each of which extend in the first direction; and a fixed component mounted on said substrate; wherein said fixed side electrode of said vibration-state monitor and said fixed side electrode of said angular velocity detector are integrally provided on said fixed component.

2. An angular velocity sensor according to claim 1, wherein the second vibrator is structured and arranged to be vibratable both in the first direction of vibration of the first vibrator and in the second direction orthogonal to the vibrating direction of the first vibrator.

3. An angular velocity sensor according to claim 1, wherein said first support beam is positioned between said substrate and said first vibrator and is structured and arranged to support said first vibrator so that said first vibrator is displaceable in one direction, and said second support beam is positioned between said first vibrator and said second vibrator and is structured and arranged to support said second vibrator so as to be displaceable in a direction orthogonal to said one direction.

4. An angular velocity sensor according to claim 1, wherein:

in said angular velocity detector, said fixed side electrode is a detection fixed side electrode and is provided on said substrate; and said movable side electrode is a detection movable side and is provided on said second vibrator opposite to said detection fixed side electrode.

5. An angular velocity sensor according to claim 1, wherein:

in said vibration-state monitor said fixed side electrode is a monitor fixed side electrode and is provided on said substrate; and said movable side electrode is a monitor movable side electrode and is provided on said first vibrator opposite to said monitor fixed side electrode.

6. An angular velocity sensor according to claim 5, wherein:

in said angular velocity detector, said fixed side electrode is a detection fixed side electrode and is provided on said substrate; and said movable side electrode is a detection movable side electrode and is provided on said second vibrator opposite to said detection fixed side electrode.

7. An angular velocity sensor according to one of claims 4 and 6, wherein said detection fixed side electrode and said detection movable side electrode are structured and arranged such that an electrostatic capacitance therebetween varies in accordance with the displacement of said second vibrator.

8. An angular velocity sensor according to one of claims 5 and 6, wherein said monitoring fixed side electrode and said monitoring movable side electrode are structured and arranged such that an electrostatic capacitance therebetween varies in accordance with displacement of said first vibrator.

* * * * *